United States Patent [19]
Felciano et al.

[11] Patent Number: 6,052,730
[45] Date of Patent: Apr. 18, 2000

[54] METHOD FOR MONITORING AND/OR MODIFYING WEB BROWSING SESSIONS

[75] Inventors: Ramon M. Felciano, Palo Alto; Russ B. Altman, Menlo Park, both of Calif.

[73] Assignee: The Board of Trustees of the Leland Stanford Junior University, Palo Alto, Calif.

[21] Appl. No.: 09/004,584

[22] Filed: Jan. 9, 1998

Related U.S. Application Data

[60] Provisional application No. 60/035,294, Jan. 10, 1997.
[51] Int. Cl.[7] .................................................. G06F 15/173
[52] U.S. Cl. ......................... 709/225; 709/203; 709/217; 709/219; 709/224; 709/246
[58] Field of Search ........................ 395/200.93, 200.47, 395/200.49, 200.54, 200.55, 200.59, 200.76; 709/203, 217, 219, 224, 225, 246

[56] References Cited

U.S. PATENT DOCUMENTS

| | | | |
|---|---|---|---|
| 5,712,979 | 1/1998 | Graber et al. | 395/200.11 |
| 5,751,956 | 5/1998 | Kirsch | 395/200.33 |
| 5,764,906 | 6/1998 | Edelsstein et al. | 395/200.49 |
| 5,784,564 | 7/1998 | Camaisa et al. | 395/200.54 |
| 5,796,952 | 8/1998 | Davis et al. | 395/200.54 |
| 5,862,330 | 1/1999 | Anupam et al. | 395/200.34 |
| 5,864,676 | 1/1999 | Beer et al. | 395/200.59 |
| 5,892,919 | 4/1999 | Nielsen | 395/200.58 |

*Primary Examiner*—Zarni Maung
*Assistant Examiner*—Saleh Najjar
*Attorney, Agent, or Firm*—Lumen Intellectual Property Services

[57] ABSTRACT

A method for transparently monitoring and/or modifying web browsing activities over an entire computer network does not require modification of client software and can be implemented on a single server. By rerouting HTTP requests through a centralized gateway server, the sequence and timing of URLs accessed by individual clients are recorded, providing the full information required to recreate a user session. The client HTTP requests are rerouted through the gateway server by modifying URLs within HTML documents. For each document sent to the client, any original URL which points to another server is modified so that it points to a CGI script program on the gateway. The gateway server then fetches the requested document from the other server, modifies the URLs within the document, and passes it on to the client. Thus, subsequent requests from the client will automatically be directed through the gateway server. The method permits tracking individual web sessions and provides valuable information about user behavior. This information can be used for general purpose evaluation of web-based user interfaces to information systems. The technique can also be used to modify a browsing experience by layering or stripping hypertext content or functionality.

12 Claims, 2 Drawing Sheets

METHOD FOR MONITORING AND/OR MODIFYING WEB BROWSING SESSIONS

CROSS-REFERENCES TO RELATED APPLICATIONS

This application claims priority from U.S. provisional patent application Ser. No. 60/035,294 filed Jan. 10, 1997, which is incorporated herein by reference.

STATEMENT REGARDING GOVERNMENT SUPPORT

This invention was supported in part by the National Library of Medicine under grants LM-07033, LM-05652, and LM-05305. The Government has certain rights in the invention.

FIELD OF THE INVENTION

This invention relates generally to techniques for processing HTTP requests from a client machine. More particularly, it relates to methods for monitoring and/or modifying hypertext browsing activities.

BACKGROUND OF THE INVENTION

In order to evaluate existing web site organization and improve web site design, there is a need to understand how users access and use hypertext resources. Current methods for monitoring the use of web resources, however, either require the modification of the client browser or are limited to tracking access to a single server. Modifying all client browsers is an expensive and impractical solution since all existing browsers would have to be modified. Present approaches to monitoring web browsing activity, therefore, have focused on the server. Although these techniques permit a server to record all requests which are directed to that particular server, once the user has browsed to another site, information about the browsing activity of the user is not available. Because a browsing session typically involves jumping between many different servers, no single server is able to accurately determine from its log what any given user has done. One possible solution is for sites to collaborate and attempt to determine user activity from a combination of their HTTP log files. This solution is impractical, however, and would still result in a very incomplete record of a user's browsing session. Another possible solution is to require that the client use a proxy server, as in the case of clients behind an internet firewall. This solution, however, requires special proxy servers and requires that the users manually configure their browsers to a particular proxy server to turn on tracking and then manually change the configuration to turn off tracking.

OBJECTS AND ADVANTAGES OF THE INVENTION

It is an object of the present invention to provide a method for monitoring web browsing activities that does not require modification or reconfiguration of client software, and does not require information from other servers. Another object of the invention is to monitor a client browsing session that includes access to multiple servers. A further object of the invention is to provide such a method that is almost entirely transparent to the client browser. Another object of the invention is to allow complete tracking of a client browsing session, including detailed link usage, page visits, and the sequence in which the accessing took place. Another object of the invention is to allow such tracking information to be generated and recorded through the use of a single server.

Additional objects and advantages will become apparent from the following description.

SUMMARY OF THE INVENTION

The above objects and advantages are obtained by a method implemented on a first HTTP server machine for processing HTTP requests from an HTTP client machine, the method comprising
   (a) receiving an HTTP request from the client;
   (b) parsing the request to identify a URL parameter pointing to a second HTTP server machine;
   (d) retrieving from the second server an HTML document associated with the URL;
   (e) modifying the HTML document such that original URLs within the document are changed to new URLs, wherein the new URLs point to the first HTTP server and include the original URLs as parameters; and
   (f) sending the modified HTML document to the client.

In a preferred embodiment of the method includes the step of storing client HTTP request information in a database, wherein the HTTP request information includes information such as a client identifier, the URL pointing to the second HTTP server, the date of the request, and the time of the request. The method may also include the step of modifying the HTML document such that content is inserted into and/or deleted from the document. Such inserted or deleted content might include, but is not limited to, hyperlinks, applets, scripts, visible text, and images. In one variation of the invention the insertions and/or deletions are selected dynamically based in part on user profile information associated with the client. In another aspect of the invention, the method automatically generates user profile information using information in the database. For example, the information could form the basis for an examination of web sites visited by the user and the results could be analyzed to generate a keyword profile of the user. This profile, which is ultimately based on the database information, could then be used to perform an automated web search. In another aspect of the invention, the method includes the step of tracking accesses of a user to a set of commercial web resources. Such tracking can be used for restricting access or for charging for access to valuable data resources. The method can be implemented on several gateway servers in parallel, with a central server acting as an initial entry to the system. By appropriately selecting the URL of the modified links, the user can be automatically routed from one gateway server to another.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

HTTP, HTML, URLs and CGI scripts

Figure 1:
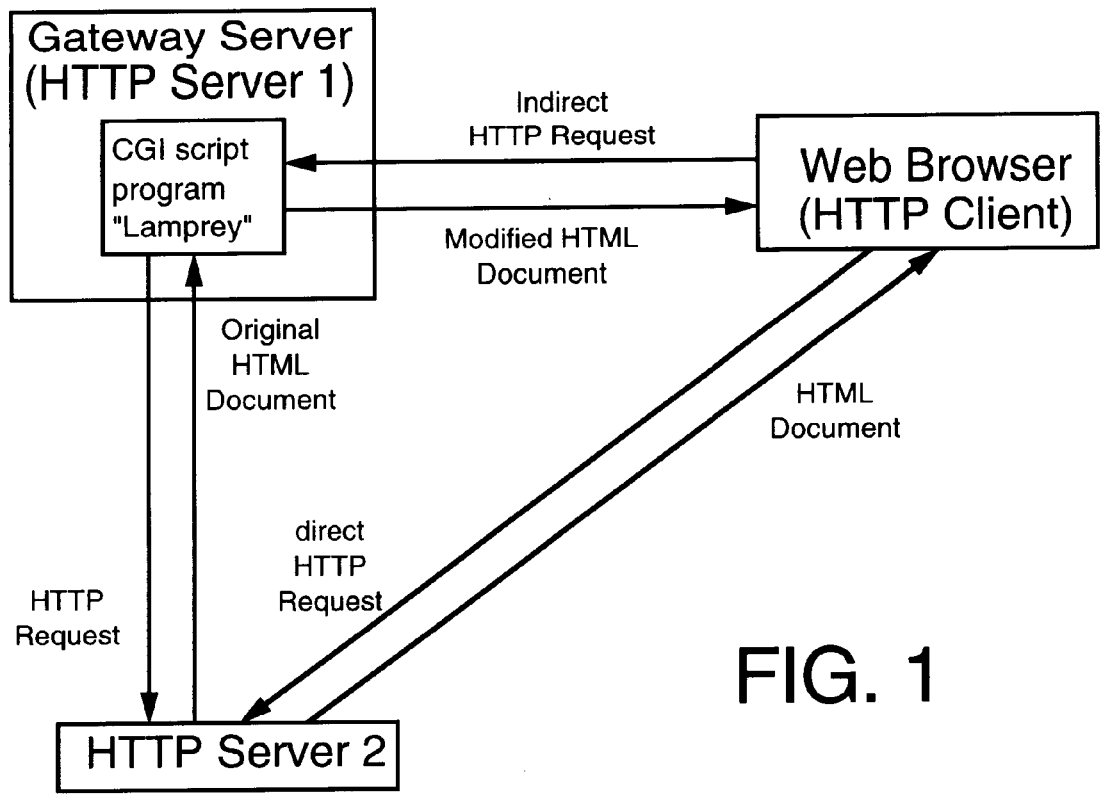
FIG. 1 is a schematic diagram of a system architecture according to the present invention.

In a preferred embodiment of the invention, the method is implemented as a CGI script written in Perl that is executed on a central gateway HTTP server, as shown in FIG. 1. The gateway server is a conventional web server machine with standard server software. The server is connected to a computer network, such as the internet, which enables the server to communicate with other servers and with clients via TCP/IP connections. A web browser (i.e., HTTP client) can request HTML documents from various servers in accordance with the HTTP protocol by specifying a URL. A URL typically contains an internet host name, a directory path, and an HTML file name. For example, the URL "http://www.uspto.gov/patent/5123456.html" is used to request from an internet server "www.uspto.gov" (shown as HTTP Server 2 in FIG. 1) a document "5123456.html" in a directory "patent". This request is sent directly from the client to the server. The HTTP Server 2 responds by sending the file 5123456.html directly back to the client. The HTML file 5123456.html typically contains hyperlinks embedded within it that have URLs pointing to other documents which may be located anywhere on the network. By selecting one of these URLs at the client, an HTTP request is sent to the appropriate server and the document associated with the URL is sent to the client.

The HTTP protocol also permits a URL to contain, instead of a file name, the name of a CGI script. Rather than sending the script to the client, the server machine executes the script program. Typically, the script program generates an HTML document and sends it to the client. In order to allow the client to provide input data for the script program, the HTTP protocol allows the URL to have various parameters appended to it following the path name. For example, the URL "http://www.uspto.gov/cgi-bin/search?rabbits" is an HTTP request for the server "www.uspto.gov" to execute a CGI script called "search" with an input parameter "rabbits". The server might respond by searching a database for the word "rabbits" and generate an HTML document containing URL links to relevant documents, some of which may be on other servers. By selecting one of the links, the client sends an HTTP request to the server to retrieve one of the documents about rabbits. That HTML document, in turn, typically has further URL links to other documents. By following these links, the client jumps from server to server.

Because the user following these links is not continuously in contact with a single server, it is generally not possible to monitor from the network the browsing patterns of a client machine. This inability presents problems for web site administrators who have a need or desire to understand the browsing patterns of clients who visit their site and follow links to other places. One primary application of the present invention is to address this problem, as described below.

URL Substitution

The CGI script on the Gateway Server is called "Lamprey". HTTP requests that call Lamprey provide a URL as a parameter fed to Lamprey. For example, a client might send a URL of the form http://www.stanford.edu/cgi-bin/lamprey
   ?url=http://www.uspto.gov/patent/5123456.html
   &user=smith@aol.com
&dts=09:10:15

The www.stanford.edu gateway server machine then executes the script in the cgi-bin directory called "lamprey" which takes as input the URL "http://www.uspto.gov/patent/5123456.html" as well as the user ID "smith@aol.com" and the date-time stamp "09:10:15". The program then acts as a client and sends its own HTTP request for the document 5123456.html from the server www.uspto.gov. (Note that these two servers can, in general, be the same.) After the HTML document is retrieved, the program then replaces every original URL in that document with a modified URL and returns the modified document to the client instead of the original document. Thus the original request functioned as an indirect request, via the gateway server, for the document on the second server. Moreover, the requested document is passed to the client indirectly through the gateway server where it is modified by lamprey prior to being forwarded to the client. In particular, lamprey modifies the URLs so that they are not direct links, but rather indirect links that point to the lamprey script on www.stanford.edu and have as their parameters the original URLs. Thus, any link the user follows from the modified document will again pass through the lamprey program rather than going directly to the server to which the link originally pointed.

Figure 2:
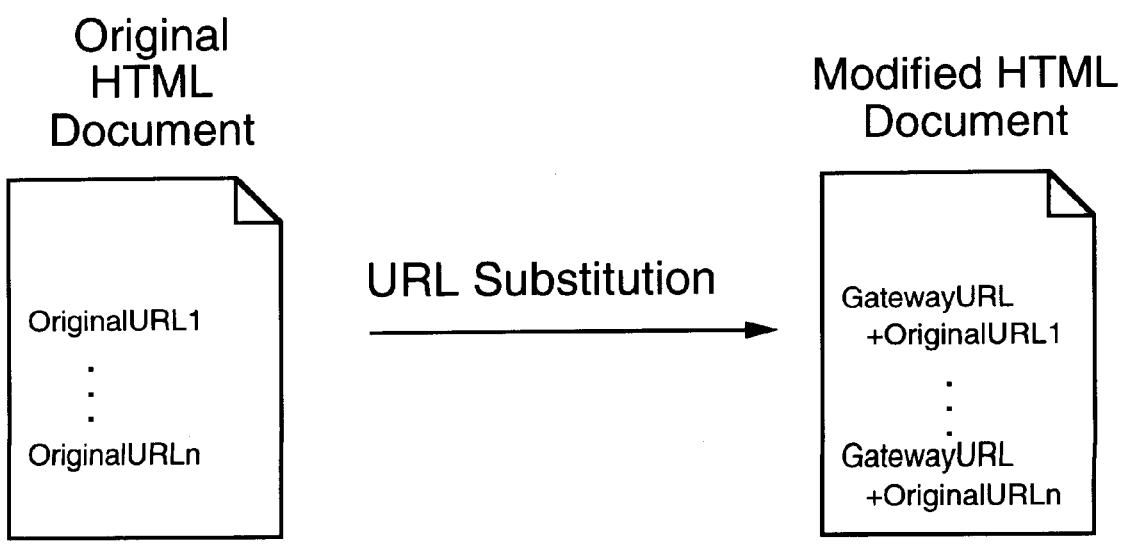
FIG. 2 is a diagram illustrating how an original document is modified through the process of URL substitution in accordance with the method of the present invention.
Figure 3:
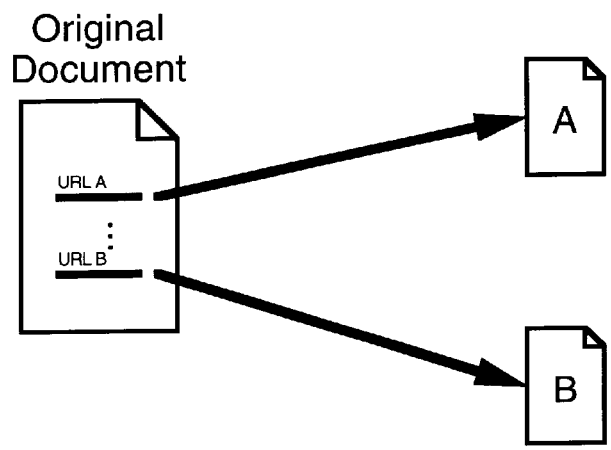
FIG. 3 is a schematic diagram illustrating how links from an original document point directly to HTML documents.
Figure 4:
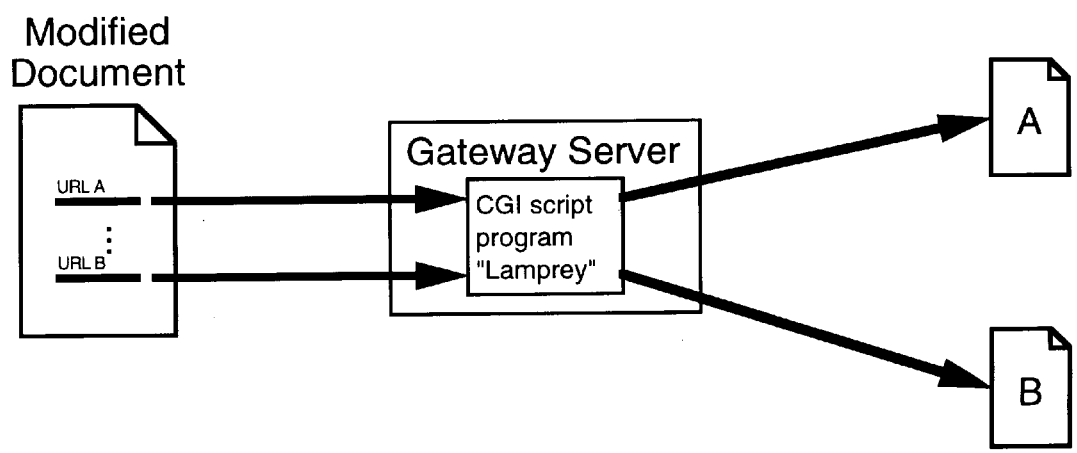
FIG. 4 is a schematic diagram illustrating how links from a modified document point indirectly to HTML documents by first passing through a gateway server.

This URL substitution technique, illustrated in FIG. 2, is the key to the present invention. It solves various problems and permits various useful tasks to be performed. The original document contains various original URLs which may point to any locations on the internet. After URL substitution by Lamprey, these original URLs are changed to gateway server URLS that have the original URLs as script arguments. FIG. 3 and FIG. 4 illustrate the effect of this substitution. The URLs in the original document point directly to the secondary servers, as shown in FIG. 3. The URLs in the modified document, on the other hand, point to the Lamprey script program on the gateway server, as shown in FIG. 4. Using the arguments in these modified URLs, Lamprey requests the actual documents directly on behalf of the client.

Storing and Tracking

Although it has many other useful applications, the primary motivation for developing Lamprey was to assist in tracking user browsing. Because every HTTP request passes through the lamprey program, it is possible to track the browsing patterns of a client even when the client follows links to HTML documents on other servers.

In order to accomplish this, the lamprey program simply stores the client HTTP request information in a database. The information includes a client identifier (such as an IP address or user-provided ID) and the URL of the requested HTML document. Additional information, such as the time and/or date of the request can also be recorded. This database of HTTP request information can be analyzed to obtain useful information, as described below.

In the preferred embodiment, the lamprey program maintains a database of log files which store the client HTTP request information. Each time a request passes through lamprey, the following information is logged in a tab-delimited text file:

1. User ID (entered by the user)
2. Date & time stamp
3. URL (link destination)
4. Date & time stamp for when the source page was generated
5. Referrer
6. IP address of client
7. Hostname of client
8. User_agent (client web browser name)

Tracking individual web sessions provides valuable and detailed information about user behavior, including where they go anywhere on the web, how long they spend at particular sites, and how they get from place to place. In contrast to prior methods, the present method permits tracking detailed link usage. For example, if three different links on a page all point to the same place, Lamprey can distinguish between them. Existing tracking logs (e.g., server-based logs) do not. This is important since there can be multiple URLs per page and multiple pages per server: since Lamprey tracks locations within a page, it can generate a more detailed representation of a user's browsing pattern.

Tracking information can be used for general purpose evaluation of web-based user interfaces to information systems. Web site designers, for example, may find the information useful in analyzing how to improve the design of web sites and increase ease of use. Because the actual browsing steps a user takes are all tracked, web site builders can see which pages users return to regularly as they navigate a site, and which ones are rarely visited. The order and frequency in which pages are visited by a particular user during a session provide valuable information to site designers that can help improve the efficiency of site organization. The method is also useful for tracking and analyzing how people use the results of search engines. Since search engines usually present search results as a list of links to other sites, Lamprey can track how users use these results. Do they only use the first 3 links? Do they follow one link, browse that site for a while, then come back? How often do they come back to that first page? This type of cross-server tracking information was impossible or very difficult to obtain prior to the present invention. Tracking information can also be useful in the context of advertising. By assuming ad banners are graphics of a certain height and width, Lamprey can track what ads, on any site, a user sees during a browsing session. For example, a first company may be interested to know that their ads are within 2 clicks of another company.

An enhancement of this method for client browsers with the ability to execute scripts can provide more detailed tracking information, if desired. The lamprey program can send an applet and/or script to the client for execution. The applet or script then monitors the activities of the user while viewing the page and sends information back to the server for recording.

Transparency and Notification

It should be noted that, the present method of routing all HTTP requests through lamprey is almost entirely transparent to the client. The advantage of this transparency is that users are not required to alter their natural browsing behavior, and the browsing has the same look and feel as if it were not passing through lamprey. Because users who view the URL addresses displayed in their browsers will notice that they are all being directed toward the lamprey server, the users can always detect the fact that their browsing is passing through the lamprey server, and can easily break out of lamprey by manually entering a new URL that points directly to a different web site. In order to alert the users to the fact that the HTTP requests are passing through the lamprey server, the CGI script program can modify each HTML document so that, when rendered by the client browser, it will display to the user a notice that the session is being monitored, e.g. a "(L)" can be prepended to the title of each document that passes through lamprey, and a small header line containing an announcement that the session is being tracked and a URL of the tracking server. Various other techniques can be used to alert the user as well. Such notification is optional.

It is possible to make Lamprey even more transparent to the client by instructing the client browser to create a new window that hides the location box at the top of the window. Unless the user manually chooses to show the location box, the URL of the current page will not be visible, and the user will not be able to distinguish between the original page and the modified one. This approach, however, assumes that the client browser is able to respond to an instruction to open a new window without the location box visible. While at least one common browser supports this feature, others may not.

Other protocols

In the preferred embodiment, the lamprey program supports basic web browsing, including forms submissions. Because images and binary files require large bandwidth and do not contain links to subsequent documents, URLs to these items are not altered by the preferred embodiment and requests for these items are not tracked. If tracking these items is desired, however, these items can be tracked in the same manner as standard HTML documents.

In general, Lamprey tracks web pages and any objects that are displayed in the web page. Any information that is tracked is either (a) explicitly requested by the user by clicking on a link or (b) implicitly requested by the browser in order to correctly display embedded content, such as images.

For example, a web page may include a graphic that is stored on an FTP server by using a tag <IMG SRC="ftp://ftp.images.com/pub/sample.gif">.

Lamprey can recognize and track this URL because the gif is automatically retrieved by the browser for inclusion in the displayed web page (assuming the browser is graphical and is configured to automatically load images). In essence, the browser follows the link for the user and assumes the user wants to display the link.

In addition, the lamprey program can track the use of FTP, GOPHER, WAIS, and other types of links that use different protocols. Suppose, however, that a web page points to an FTP server using the tag <A HREF="ftp://ftp.images.com/pub/">free pictures</A>, Although Lamprey can recognize this URL, and record when the user follows it, the subsequent FTP transactions are not tracked by Lamprey.

Therefore, if a web page links to an FTP site, GOPHER service or WAIS gateway, Lamprey can detect that the user decides to follow this link (e.g. go to the FTP site) but cannot track subsequent interactions with this service (e.g. how the user navigates the directory tree of the FTP site). This limitation is due to the fact that the client browser is now interacting through the FTP protocol and not the HTTP protocol, so Lamprey is out of the loop. Thus, Lamprey can track the launch of but not the subsequent use of non-HTTP navigation.

Scaling and Hand-Off

The method of the present invention may be scaled in various ways to accommodate heavy use. For example, a client can begin a tracking session at a central server whose CGI program is able to dynamically assess the load on each of a collection of gateway servers. The central server then selects the gateway server having the smallest load and uses URL substitution to hand off the client to that gateway server for tracking. Each gateway server then operates exactly as described above for the case of one gateway server.

Additional Applications

The method of the invention can be used for many applications other than or in addition to tracking user browsing patterns. Of particular importance is the use of the technique to modify a browsing experience by layering or stripping hypertext content which changes the visible content or functionality of the original hypertext. The particular type of layering or stripping can be dynamically configured depending on the individual user and the specific document being accessed. For example, a user with a low-bandwidth connection to the internet may want to surf the web with all graphics images above 30K in size eliminated. The CGI program then selectively modifies URLs to provide only the smaller images to that particular client. Another user may want links to conversion programs automatically inserted next to links to various types of binary files. Links of various types could be inserted into documents and selected in real-time depending on the profile of an individual user and the content of the particular web page being requested. Yet another type of content enhancement is to embed convenient links within pages at appropriate locations. For example, for every link to a Postscript file on a web page, Lamprey can replace it with, or insert an additional link to a Postscript-to-PDF-converter CGI that includes a pointer to the original Postscript file as a parameter. Because most browsers cannot display Postscript, but can display PDF, the user is provided with convenient access to web resources that would otherwise be very difficult to view. Thus, Lamprey can customize the web experience of a user by selectively and intelligently substituting URLs and other HTML.

Another important application of the present invention is for monitoring and assessing access to specific resource materials or databases on the web. The gateway server, for example, can be used as a "toll booth" that allows access to and charges for access to various web content. The content vendor machines can be configured to refuse access to requests from any server except the gateway server. Clients registered with the gateway server can then access the web content provider only through the gateway server which tracks and charges the client for access to the various resources. The key benefit to this approach is that the content provider can be organizationally and technically separate from the toll collector. Moreover, a single Lamprey server can act as a toll booth for any number of third party sites. This arrangement also has the advantage that the content vendors do not need to register users, limit access in complicated ways, or keep track of charges. The advantage to the users, on the other hand, is that they obtain easy access to data from a variety of different content providers through registration with and payment to the single gateway site.

The information obtained while monitoring a single client over time can also be used to provide various valuable services to the user. For example, an analysis of the database can provide automatic lists of URLs that the user has visited, sorted in various ways. The list could be sorted with the most frequently visited URLs first. Alternatively, the URLs could be grouped by subject. In addition, a graphical presentation of the user's browsing pattern through the web could be constructed, showing the relationship between the URLs visited. Reports of the type described above can be generated by CGI scripts and sent as HTML documents to a client upon request, or can be generated by other programs that are given access to the database. The gateway server could also be configured to notify a user by e-mail when URLs that were visited in the past by the user have been updated. The server could also perform periodic web searches based on an automated analysis of the content documents that the user has browsed. For example, the top ten keywords in the pages a user visits could be fed into search engines to do daily checks for similar pages of interest. Another valuable service to some users is recording a list of media types that the user encountered while browsing. This information can be useful to parents who wish to monitor the content that their children view. The list could be sent to the parent via e-mail at the end of each day.

It will be clear to one skilled in the art that the above embodiment may be altered in many ways in addition to those variations already mentioned above without departing from the scope of the invention. Accordingly, the scope of the invention should be determined by the following claims and their legal equivalents.

What is claimed is:

1. A method implemented on a first HTTP server machine for processing HTTP requests from an HTTP client machine, the method comprising:
    (a) receiving an HTTP request from the client;
    (b) parsing the request to identify a URL parameter pointing to a second HTTP server machine, wherein the second HTTP server machine is distinct from the first HTTP server machine;
    (c) retrieving from the second server machine an HTML document associated with the URL;
    (d) modifying the HTML document such that original URLs within the document are changed to new URLs, wherein the new URLs point to the first HTTP server machine and include the original URLs as parameters; and
    (e) sending the modified HTML document to the client.

2. The method of claim 1 further comprising the step of storing client HTTP request information in a database, wherein the HTTP request information comprises information chosen from the group consisting of a client identifier, the URL pointing to the second HTTP server machine, the date of the request, and the time of the request.

3. The method of claim 1 further comprising modifying the HTML document such that new content is added.

4. The method of claim 3 wherein the new content comprises a hyperlink, an applet, script, visible text, or an image.

5. The method of claim 3 wherein the new content is selected in dependence upon user profile information.

6. The method of claim 1 further comprising modifying the HTML document such that a portion of the document is removed.

7. The method of claim 6 wherein the portion comprises a hyperlink, an applet, script, visible text, or an image.

8. The method of claim 6 wherein the removed portion is selected in dependence upon user profile information.

9. The method of claim 2 further comprising the step of generating a user profile using information in the database.

10. The method of claim 2 further comprising performing an automated web search using information in the database.

11. The method of claim 1 further comprising tracking accesses of a user to a set of commercial web resources.

12. A method implemented on a first HTTP gateway server machine for processing HTTP requests from an HTTP client machine, the method comprising:
    (a) receiving at the first gateway server machine an HTTP request from the client;
    (b) parsing the request to identify a URL parameter pointing to a third HTTP server machine;
    (c) retrieving from the third server machine an HTML document associated with the URL;
    (d) modifying the HTML document such that original URLs within the document are changed to new URLs, wherein the new URLs point to a second HTTP server machine and include the original URLs as parameters; and
    (e) sending the modified HTML document to the client.

* * * * *